July 30, 1963 K. REUSCHEL ETAL 3,099,523
METHOD OF PRODUCING HYPERPURE SILICON, SILICON
CARBIDE AND GERMANIUM
Filed Dec. 15, 1961
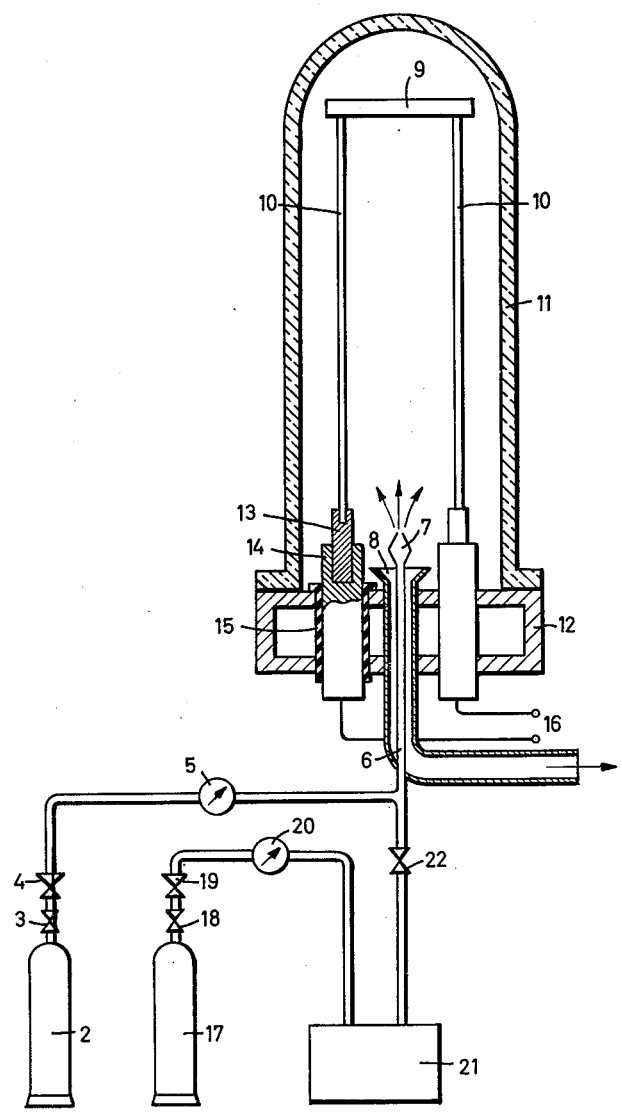

United States Patent Office 3,099,523
Patented July 30, 1963

3,099,523
METHOD OF PRODUCING HYPERPURE SILICON, SILICON CARBIDE AND GERMANIUM
Konrad Reuschel, Pretzfeld, and Arno Kersting, Lutzelsdorf, near Pretzfeld, Germany, assignors to Siemens-Schuckertwerke Aktiengesellschaft, Berlin-Siemensstadt, Germany, a corporation of Germany
Filed Dec. 15, 1961, Ser. No. 159,717
Claims priority, application Germany Dec. 17, 1960
2 Claims. (Cl. 23—1)

Our invention relates to a method for producing hyperpure silicon, silicon carbide or germanium for electronic purposes, according to which the semiconductor material is obtained by chemical conversion from a gaseous compound of the same semiconductor material, particularly a halogen compound, with the aid of a carrier gas acting as a reduction agent, particularly hydrogen, and is precipitated upon solid carrier rods of the same semiconductor material which are heated by directly passing electric current through the rods, within an at least partially transparent reaction vessel of glass or quartz. Suitable for such pyrolytic precipitation of silicon are preferably silicochloroform, $SiHCl_3$, or silicon tetrachloride, $SiCl_4$. Silicon carbide can be pyrolytically precipitated from monomethyltrichlorsilane, $SiCH_3Cl_3$, and germanium from germanium tetrachloride, $GeCl_4$. Such a method is known, for example, from Schweickert et al. Patent No. 3,011,877, issued December 5, 1961.

During the precipitation process, the carrier rods, by directly passing electric current therethrough, are maintained at a bright red glowing temperature at the rod surface, this temperature being, for example, about 1200° C. for silicon. The great temperature drop between the carrier-rod surface and the quartz cylinder of the vessel results in the formation of a silicon precipitate on the inner wall surface of the reaction vessel, particularly at the beginning of the precipitation process. This brown precipitation of silicon on the quartz cylinder or bell interferes with the pyrometric measurement of temperature and in some cases may virtually prevent such measurement. Furthermore, portions of the precipitation may scale off from the quartz bell and may be whirled together with the gas mixture onto the surface of the carrier rods, thus transferring impurities from the quartz wall onto the silicon being precipitated. With increasing thickening of the carrier rods and the corresponding increase in heat radiating therefrom, the temperature of the quartz vessel increases likewise. Then, for example, the hydrogen chloride evolving from the reaction may again dissolve the silicon precipitated on the quartz wall, thereby causing a further transfer of impurities onto the carrier rods.

The precipitation of silicon on the quartz wall can be prevented according to co-assigned, copending application Serial No. 737,254, filed May 23, 1958, now Patent No. 3,042,494, by maintaining the quartz vessel during the precipitation process on a temperature between 300 and 800° C. However, it is difficult to maintain the required minimum temperature of 300° C. at the beginning of the precipitation process when the carrier rods are still relatively thin and hence their heat radiation is also relatively slight.

It is an object of our invention to eliminate these difficulties.

To this end, and in accordance with our invention, we proceed as follows. Prior to commencing the pyrolytic precipitation process, we first pass a partial current of the carrier gas, such as hydrogen, through the reaction vessel. We then heat the carrier rods in the current of gas to glowing temperature. Thereafter, we increase the carrier-gas current to the full amount required for normal precipitating operation and, after the inner wall of the reaction vessel has nearly reached or exceeded a temperature of 300° C., we supply the gaseous semiconductor compound to the reaction vessel. As a result, the precipitation of silicon on the inner surface of the quartz wall is reliably prevented, also at the beginning of the reaction process. It has been found that the coating on the quartz wall, formed by disproportioning of the gaseous semiconductor compound, is essentially affected by the molar ratio of semi-conductor compound and carrier gas in the reaction-gas mixture, and that no precipitation takes place as long as this molar ratio does not appreciably exceed 0.2.

The drawing illustrates schematically, and by way of example, apparatus for producing hyperpure silicon from silicochloroform, employing hydrogen as carrier and reaction gas, and affording a simple mode of performing the method according to our invention.

Before commencing the precipitation process, hydrogen, which is to be used as carrier and reaction gas, is supplied to the reaction vessel from a gas bottle 2 through stop valve 3, a plural-stage reduction valve 4, and a gas-flow meter 5. The hydrogen enters into the reaction vessel through a gas line 6 and a nozzle 7, which produces a turbulent flow and causes a thorough rinsing of the reaction chamber with hydrogen. The spent gases are exhausted from the reaction space through a gas outlet conduit 8 which concentrically surrounds the gas inlet pipe 6 at the place where it enters the reaction equipment proper. The carrier rods 10 of hyperpure silicon are disposed in the reaction vessel constituted by an hermetically sealed quartz cylinder or bell 11 and a bottom closure plate or base 12 which is cooled, preferably by means of a flowing coolant. The inner diameter of the quartz bell 11 may be about 150 mm. and its height may be about 550 mm., for example. The lower end of each silicon rod 10 is firmly inserted into the bore of a holder 13 consisting, for example, of spectral carbon and fastened in a cylindrical metallic conductor plug 14 which extends through a hollow base plate 12. The upper ends of the two rods 10 are not further supported but are electrically connected with each other by a bridge piece 9 consisting of spectral carbon or of the same semiconductor material as the rods 10. The holder plugs 14 may be fastened in the base plate 12 by having respective external screw threads in threaded engagement with the bores of the base plate 12. At least one of the plugs 14 is insulated from the base plate 12 by means of an insulating sleeve 15.

After sufficient rinsing of the reaction space by hydrogen in the above described manner, the carrier rods 10 are connected at 16 with a voltage source and are electrically heated to a bright red glow corresponding to a temperature of about 1200° C. for silicon. When this temperature is reached, the flow of hydrogen is increased to such a quantity as corresponds to the molar ratio of silicochloroform to hydrogen required for the pyrolytic precipitation process. A molar ratio of 0.2 as described above is suitable. Thereafter hydrogen from a gas bottle 17 is supplied through a stop valve 18, a plural-stage reduction valve 19 and a flow meter 20 through an evaporator 21 containing, for example, silicochloroform, $SiHCl_3$. The hydrogen becomes mixed in the evaporator 21 with the evaporating silicon compound. This gas mixture passes through a stop valve 22 into the gas line 6 and is thus supplied to the reaction space. Thereafter the hydrogen supply from bottle 2 is reduced to adjust the molar ratio to that required. Thereafter the precipitation process is performed and continued in the known manner.

The method described above with reference to the precipitation of silicon is employed in the same manner for the precipitation of germanium and silicon carbide, using suitable semiconductor compounds as mentioned above. Suitable as reduction agent and carrier gas, aside from hydrogen, $H_2$, are also hydrocarbon compounds. For example methane, $CH_4$, can be used for the precipitation of silicon carbide.

We claim:

1. In the process of preparing a semiconductor from the group consisting of silicon, silicon carbide and germanium, in which the semiconductor is precipitated upon a hot carrier rod of the same material, by chemical conversion from a gaseous compound of said semiconductor material with the aid of a carrier gas acting as a reducing agent, within an at least partially transparent vessel at least partially comprised of a material taken from the group consisting of glass and quartz, the improvement which substantially prevents the precipitation of semiconductor material on the inner wall of the reaction vessel, and which comprises the sequential steps of (a) passing a partial current of carrier gas through the reaction vessel prior to initiating the precipitation process.

(b) heating the carrier rods to incandescent temperature in the carrier gas current of step (a), (c) increasing the carrier gas current to the full amount required for normal precipitation operation, (d) after the inner wall of the reaction vessel has reached a temperature of about 300° C., supplying gaseous semiconductor compound in an amount so that the molar ratio of semiconductor compound to carrier gas is less than about 0.2:1, and (e) commencing and performing the pyrolytic precipitation.

2. In the process of preparing semiconductor silicon, in which the semiconductor silicon is precipitated upon a hot carrier rod of hyperpure silicon, by chemical conversion from a gaseous compound of said semiconductor silicon with the aid of a carrier gas acting as a reducing agent, within an at least partially transparent vessel at least partially comprised of a material taken from the group consisting of glass and quartz, the improvement which substantially prevents the precipitation of silicon on the wall of the reaction vessel, and which comprises the sequential steps of (a) passing a partial current of carrier gas through the reaction vessel prior to initiating the precipitation process, (b) heating the carrier rods to incandescent temperature in the carrier gas current of step (a), (c) increasing the carrier gas current to the full amount required for normal precipitation operation, (d) after the inner wall of the reaction vessel has reached a temperature of about 300° C., supplying gaseous silicon compound in an amount so that the molar ratio of silicon compound to carrier gas is less than about 0.2:1, and (e) commencing and performing the pyrolytic precipitation.

References Cited in the file of this patent

UNITED STATES PATENTS

| | | |
|---|---|---|
| 2,981,605 | Rummel | Apr. 25, 1961 |
| 3,011,877 | Schweickert et al. | Dec. 5, 1961 |